G. A. SORENSEN.
EGG COOKER.
APPLICATION FILED DEC. 5, 1919.

1,388,614.

Patented Aug. 23, 1921.

Witnesses
W. C. Fielding
J. P. Campbell

Inventor
Gustav A. Sorensen

By Richard B. Owen
Attorney

UNITED STATES PATENT OFFICE.

GUSTAV ANTON SORENSEN, OF JAMAICA, NEW YORK.

EGG-COOKER.

1,388,614.  Specification of Letters Patent.  Patented Aug. 23, 1921.

Application filed December 5, 1919. Serial No. 342,587.

*To all whom it may concern:*

Be it known that I, GUSTAV A. SORENSEN, a citizen of the United States, residing at Jamaica, in the county of Queens and State of New York, have invented certain new and useful Improvements in an Egg-Cooker, of which the following is a specification.

My invention relates to new and useful improvements in egg cookers and has for its principal object the provision of such a device with an alarm which will be sounded when the eggs are soft-boiled.

Another object of the invention consists in forming the cooker with a removable basket whereby the eggs may be easily removed.

Still another object of the invention resides in the provision of a novel form of cover for the cooker, said cooker carrying the whistle or alarm, and provided with a handle whereby the cover may be easily removed from the cooker.

A still further object consists in providing novel means for securing the cover in position while boiling the eggs.

With these and other objects in view my invention consists in the novel details of construction and arrangement of parts which will be more clearly understood from the following specification and drawings in which:—

Figure 1:
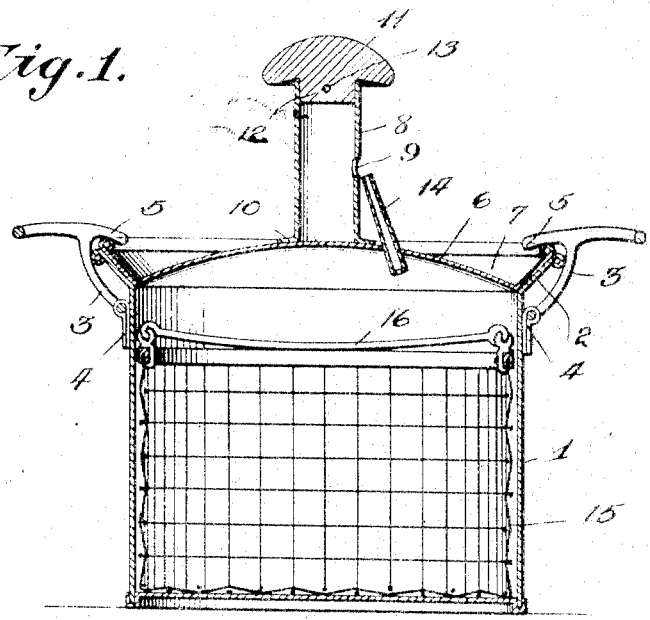
Figure 1 is a transverse vertical section.
Figure 2:
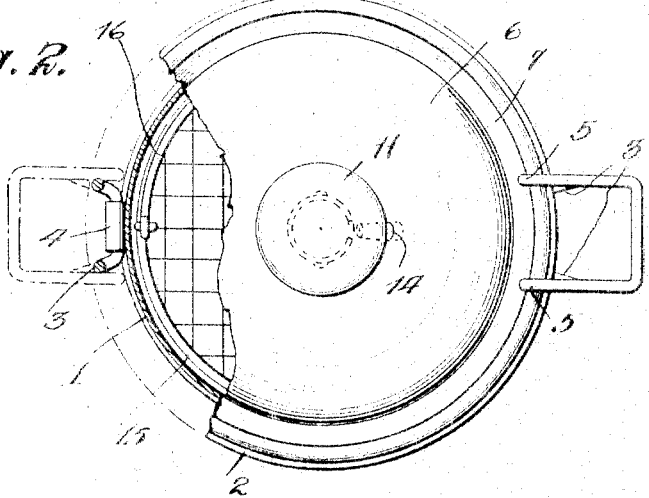
Fig. 2 is a top plan with parts broken away to show the interior of the cooker.

In the drawings the numeral 1 indicates a vessel the upper edge of which is flared outwardly to form a flange 2. A bail or clamp 3 is pivotally connected to each side of the vessel 1 by means of the straps 4 and said bails or clamps are provided with the projections 5 for a purpose to be later described.

A cover for the vessel is indicated at 6 and as is clearly shown in Fig. 1 of the drawings is preferably concavo-convex in cross section. The outer edge of the cover is bent upwardly to form the inclined flange 7 which is adapted to be received upon the flange 2 of the vessel 1. The cover is adapted to be secured upon the vessel 1 by having the extensions 5 on the bails or clamps 3 extending over the upper edge of the flange as more particularly illustrated in Fig. 1 of the drawings.

A sleeve 8 is secured upon the top of the cover 6 and is provided intermediate its ends with an opening 9 for a purpose to be later described. The sleeve 8 is provided on the lower end with the outwardly extending flange 10 and rivets or other suitable fastening means may be passed through the flange and cover for securing the sleeve in position. A knob or handle 11 is provided with a reduced shank 12 which is adapted to be received in the upper end of the sleeve. The knob or handle is secured to the sleeve by means of a pin 13 which passes through the sleeve and through the reduced shank 12.

A tube 14, open at each end, passes through the cover 6 and as shown the upper end of this tube is in close proximity to the opening 9 in the sleeve 8 whereas the lower end is adjacent the top of the vessel 1. As shown the tube 14 preferably extends at an angle and the lower end will preferably be made of slightly greater diameter than the upper end.

A wire basket 15 is adapted to be received in the vessel 1 and is provided with the bail 16 of usual construction.

From the above detailed description it is thought that the construction of my egg cooker as well as the manner of using will be clearly understood. When it is desired to use the cooker the bails or clamps 3 are swung downwardly and the cover 6 removed by grasping the handle or knob 11. The wire basket 15 is removed by means of the bail 16 and the eggs placed therein. The basket is then again lowered into the vessel 1 and the vessel is filled to the desired height with cold water. The cover 6 is then placed in position and the bails or clamps 3 swung upwardly so that the extensions 5 extend over the upper edge of the flange 7. The vessel is then placed over the fire and when the water boils steam will be generated. When the eggs become soft-boiled the steam will pass through the lower end of the tube 14 and be emitted from the upper end adjacent the opening 9. This will cause a whistling sound and give alarm to the parties that the eggs are properly cooked and should be removed. When properly cooked the cover is then removed and the eggs removed from the vessel 1 in the basket 15.

From the above it will be found that I have provided a novel form of cooker which will give an alarm when the eggs have been properly cooked. By such an arrangement the housekeeper may leave the eggs upon the fire knowing that the alarm will be sounded when they are properly cooked.

The foregoing description and the drawings have reference to what may be considered the preferred, or approved, form of my invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent is:—

1. An alarm for a cooking vessel including a cover for said vessel, a sleeve secured to the cover and provided with an opening intermediate its ends, and a tube having its ends open extending through the cover externally of the sleeve and having its upper end terminating adjacent the opening in the sleeve so as to form a whistle.

2. In an egg cooker, a vessel, a cover adapted to be received on the vessel, a sleeve secured to the cover and provided with an opening intermediate its ends, and a tube having open ends and situated externally of the sleeve so as to extend diagonally through the cover and having its upper end terminating adjacent the opening in the sleeve for the purpose of forming a whistle.

3. An alarm for a cooking vessel including a cover for said vessel, a sleeve secured to the cover and provided with an opening intermediate its ends, and a tube having open ends and situated externally of the sleeve so as to extend through the cover and terminate a distance therebelow and having its upper end situated adjacent the opening in the sleeve so as to form a whistle.

In testimony whereof I affix my signature in presence of two witnesses.

GUSTAV ANTON SORENSEN.

Witnesses:
 LESTER A. STARRETT,
 OLAF I. WARING.